US011893148B2

(12) United States Patent
Harviainen et al.

(10) Patent No.: US 11,893,148 B2
(45) Date of Patent: *Feb. 6, 2024

(54) METHODS AND SYSTEMS FOR PROVIDING HAPTIC FEEDBACK FOR VIRTUAL 3D OBJECTS

(71) Applicant: InterDigital VC Holdings, Inc., Wilmington, DE (US)

(72) Inventors: Tatu V. J. Harviainen, Helsinki (FI); Raimo J. Launonen, Nummela (FI)

(73) Assignee: InterDigital VC Holdings, Inc., Wilmington, DE (US)

( * ) Notice: Subject to any disclaimer, the term of this patent is extended or adjusted under 35 U.S.C. 154(b) by 403 days.

This patent is subject to a terminal disclaimer.

(21) Appl. No.: 16/890,439

(22) Filed: Jun. 2, 2020

(65) Prior Publication Data
US 2020/0301501 A1 Sep. 24, 2020

Related U.S. Application Data

(63) Continuation of application No. 15/749,756, filed as application No. PCT/US2016/045653 on Aug. 4, 2016, now Pat. No. 10,705,595.
(Continued)

(51) Int. Cl.
*G06F 3/01* (2006.01)
*G06F 3/0488* (2022.01)
(Continued)

(52) U.S. Cl.
CPC .............. *G06F 3/011* (2013.01); *G06F 3/016* (2013.01); *G06F 3/0488* (2013.01); *G06F 3/04815* (2013.01); *G06F 3/04845* (2013.01)

(58) Field of Classification Search
CPC ...... G06F 3/011; G06F 3/016; G06F 3/04815; G06F 3/04845; G06F 3/0488; G06F 3/017; B25J 9/1656; G06T 19/20; G01S 5/16
See application file for complete search history.

(56) References Cited

U.S. PATENT DOCUMENTS 5,803,738 A * 9/1998 Latham .................. B25J 9/1656
345/157
6,104,379 A * 8/2000 Petrich .................... G06F 3/011
345/157
(Continued)

FOREIGN PATENT DOCUMENTS

WO 2012076062 A1 6/2012

OTHER PUBLICATIONS

Written opinion of the International Preliminary Examining Authority for PCT/US2016/045653 dated Jul. 14, 2017, 11 pages.
(Continued)

*Primary Examiner* — Richard J Hong
(74) *Attorney, Agent, or Firm* — Klintworth & Rozenblat IP LLP

(57) ABSTRACT

Described herein are various embodiments for enabling realistic haptic feedback for virtual three-dimensional (3D) objects. A real proxy surface is provided for a virtual object, where the proxy surface may be a relief surface, such as a depth-compressed model of the virtual object. In an exemplary method, when a user touches a proxy surface, a position of the touch point on the surface is detected. The touch point is mapped to a corresponding point on the virtual object. A position of the virtual object is determined such that the touch point is in alignment with the corresponding point on the virtual object, and the virtual object is displayed at the first determined position on an augmented reality display. As a result, a user touching the proxy surface may
(Continued)

have the sensation of touching a solid version of the virtual 3D object instead of the proxy surface.

17 Claims, 9 Drawing Sheets

Related U.S. Application Data

(60) Provisional application No. 62/201,954, filed on Aug. 6, 2015.

(51) Int. Cl.
    *G06F 3/04815*    (2022.01)
    *G06F 3/04845*    (2022.01)

(56) References Cited

U.S. PATENT DOCUMENTS

| | | | |
|---|---|---|---|
| 6,703,924 B2 | 3/2004 | Tecu | |
| 8,816,977 B2 | 8/2014 | Rothkopf | |
| 2004/0136571 A1 | 7/2004 | Hewitson | |
| 2004/0236541 A1* | 11/2004 | Kramer | G06T 19/20 703/1 |
| 2005/0174361 A1 | 8/2005 | Kobayashi | |
| 2007/0247393 A1 | 10/2007 | Kuroki | |
| 2009/0231272 A1 | 9/2009 | Rogowitz | |
| 2009/0231287 A1 | 9/2009 | Rogowitz | |
| 2009/0251421 A1* | 10/2009 | Bloebaum | G06F 3/011 345/173 |
| 2010/0107127 A1* | 4/2010 | Han | G06F 3/011 715/848 |
| 2010/0156836 A1* | 6/2010 | Katayama | G01S 5/16 345/173 |
| 2010/0277469 A1 | 11/2010 | Borrel | |
| 2011/0096072 A1 | 4/2011 | Kim | |
| 2011/0205242 A1 | 8/2011 | Friesen | |
| 2011/0261083 A1* | 10/2011 | Wilson | G06F 3/016 345/676 |
| 2012/0188179 A1* | 7/2012 | Karlsson | G06F 3/016 345/173 |
| 2013/0257748 A1 | 10/2013 | Ambrus | |
| 2014/0015831 A1 | 1/2014 | Kim | |
| 2014/0225918 A1* | 8/2014 | Mittal | G06F 3/017 345/633 |
| 2015/0241969 A1* | 8/2015 | Elangovan | G06F 3/017 345/156 |
| 2015/0258432 A1 | 9/2015 | Stafford | |
| 2016/0133163 A1 | 5/2016 | Bostick | |

OTHER PUBLICATIONS

Notification of Transmittal of the International Preliminary Report on Patentability for PCT/US2016/045653 dated Oct. 20, 2017.
Priestnall, G., et. al., "Projection Augmented Relief Models (PARM): Tangible Displays for Geographic Information". Web Archive, Mar. 23, 2014, pp. 180-187. fr: https://web.archive.org/web/20140323184526/http://ewic.bcs.org/upload/pdf/ewic_ev12_s9paper1.pdf.
Follmer, S., et. al., "inFORM: Dynamic Physical Affordances and Constraints through Shape and Object Actuation". Tangible and Fabrication In UIST, Oct. 2013, pp. 417-426.
Kerber, J., et. al., "Real-time Generation of Digital Bas-Reliefs". Computer-Aided Design and Applications, 7(4), (2010), pp. 465-478.
Long, B., et al., "Rendering Volumetric Haptic Shapes in Mid-Air Using Ultrasound". ACM Transactions on Graphics (TOG), (2014), 33(6), 11 pages.
Kruszynski, K., et al., "Tangible Props for Scientific Visualization: Concept, Requirements, Application", Virtual Reality, Springer-Verlarg, Lo, vol. 13, No. 4, Jul. 7, 2009, pp. 235-244, XP019743369.
Leithinger, D., et al., "Sublimate: State-Changing Virtual and Physical Rendering to Augment Interaction With Shape Displays", Human Factors in Computing Systems, ACM, 2, Apr. 27, 2013, pp. 1444-1445.
Ban, Y, et al., "Displaying Shapes With Various Types of Surfaces Using Visuo-Haptic Interaction", Virtual Reality Software and Technology, ACM, Nov. 11, 2014, pp. 191-196, XP058061741.
Notification of Transmittal of The International Search Report and The Written Opinion of the International Searching Authority, or the Declaration, for PCT/US2016/045653, dated Oct. 19, 2016, 15 pages.
Kohli, Luv, et. al. "Redirected Touching: The Effect of Warping Space on Task Performance". IEEE Symposium on 3D User Interfaces, Mar. 4, 2012, pp. 105-112.
Ban, Yuki, et. al., "Displaying Shapes with Various Types of Surfaces Using Visuo-Haptic Interaction". Proceedings of the 20th ACM Symposium on Virtual Reality Software and Technology, Nov. 11, 2014, pp. 191-196.
Levin, Golan, et. al., "Augmented Hand Series". Golan Levin and Collaborators, Web Archive available at: https://web.archive.org/web/20150607040533/http://www.flong.com/projects/augmented-hand-series/, (2014), pp. 1-9.

\* cited by examiner

METHODS AND SYSTEMS FOR PROVIDING HAPTIC FEEDBACK FOR VIRTUAL 3D OBJECTS

CROSS-REFERENCE TO RELATED APPLICATIONS

The present application is a continuation of U.S. patent application Ser. No. 15/749,756, filed Feb. 1, 2018, which is a national stage application under 35 U.S.C. 371 of International Application No. PCT/US2016/045653, entitled METHODS AND SYSTEMS FOR PROVIDING HAPTIC FEEDBACK FOR VIRTUAL 3D OBJECTS, filed on Aug. 4, 2016, which claims benefit under 35 U.S.C. § 119(e) from U.S. Provisional Patent Application Ser. No. 62/201,954, entitled "Methods and Systems for Providing Haptic Feedback for Virtual 3D Objects", filed Aug. 6, 2015. The entire disclosure of each of these applications is incorporated herein by reference.

BACKGROUND

Recently, individuals' interest has increased for capturing and having available full three-dimensional (3D) reproductions of objects and scenes meaningful to these individuals. Such an object may not be adequately represented using only photography or other conventional two-dimensional techniques. Obtaining such objects for individual possession and use may not be possible for any number of reasons, such as budget and/or physical-space restrictions.

SUMMARY

Described herein are various embodiments for enabling realistic haptic feedback for virtual 3D objects. Instead of flat marker images traditionally used for camera registration in augmented reality, various embodiments described herein use a flat relief surface upon which a virtual object is augmented. The relief surface provides a compressed 3D representation of a virtual scene to be augmented, and depth information may be conveyed by reproducing correct object placement, motion parallax, occlusions, and shadows (among other examples) as if the object were in its full 3D shape.

In an exemplary method, a proxy surface is associated with a virtual object. An augmented reality system operates to detect a position of a first touch point at which a user is touching the proxy surface. The system maps the first touch point to a first corresponding point on the virtual object. A first position of the virtual object is determined such that the first touch point is in alignment with the first corresponding point on the virtual object. The virtual object is displayed at the first determined position on an augmented reality display.

The position (and/or orientation) of the virtual reality object may move in response to a change in the point at which the user is touching the proxy surface. After displaying the virtual object at the first determined position, the system may detect a position of a second touch point at which the user is subsequently touching the proxy surface. The second touch point is mapped to a second corresponding point on the virtual object, and a second position of the virtual object is determined such that the second touch point is in alignment with the second corresponding point on the virtual object. The virtual object is then displayed at the second determined position on the augmented reality display.

In some embodiments, an augmented reality system is provided that comprises a finger detector operative to detect a position of a touch point at which a user is touching a proxy surface, where the proxy surface is associated with a virtual object. An augmented reality scene manager is provided that is operative (i) to map the touch point to a corresponding point on the virtual object, and (ii) to determine a position of the virtual object such that the touch point is in alignment with the corresponding point on the virtual object. An augmented reality display, such as an augmented reality headset, is operative to display the virtual object at the determined position. The proxy surface may be a touch sensitive surface and may thus operate as a component of the finger detector.

Using systems and methods disclosed herein, a user touching the proxy surface may have the sensation of touching a fully-dimensioned 3D object instead of a surface with only compressed depth information. Use of such a relief surface enables the recording of 3D objects as relatively flat prints, making them easy to store and manage while still providing a full hapto-visual 3D representation.

DETAILED DESCRIPTION

Overview of an Exemplary Embodiment.

Figure 1:
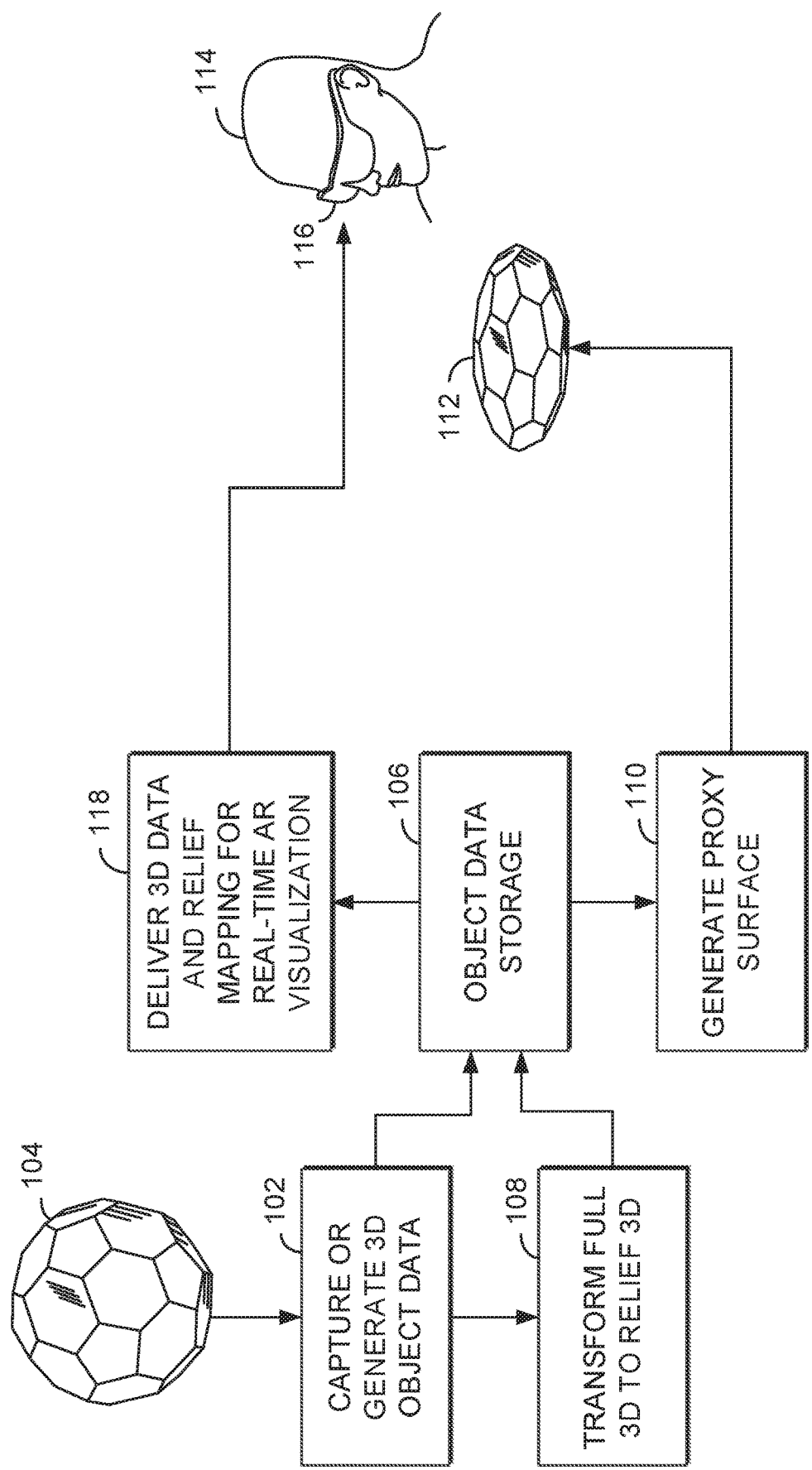
FIG. 1 is a schematic flow diagram illustrating a method performed in an exemplary embodiment.

FIG. 1 depicts an example operation of an augmented-reality system for providing a hapto-visual rendering of a three-dimensional object, in accordance with at least one embodiment. As shown, the system in step 102 captures or generates a 3D model of an object 104 and stores 3D object data in object data storage 106. The system in step 108 generates a depth-compressed 3D model based on the 3D object data. The depth-compressed 3D model may be a relief 3D model. Data describing the relief 3D model may be stored in the object data storage 106. In step 110, a proxy surface 112 is generated based on the depth-compressed 3D model. The generation of the proxy surface may be performed by various known manufacturing or prototyping techniques, such as 3D printing, molding, 2.5D printing (e.g. as demonstrated by Casio) and the like. Alternatively, the physical relief object may be generated by reconfiguring a configurable surface such as a pin array surface.

During use of an exemplary system, a user 114 is equipped with an augmented reality (AR) or virtual reality (VR) display device, such as augmented reality headset 116. In step 118, 3D data and relief mapping data are provided to the headset 116 to enable real-time augmented reality visualization. Using techniques discussed in greater detail below, the user touches the proxy surface 112, and the display device renders an image of the 3D object 104 such that a surface of the virtual 3D object is in alignment with the portion of the proxy surface 112 being touched by the user. In this way, the user is given the sensation of touching a fully-dimensioned version of object 104 while in fact he is touching only proxy surface 112, which may be compressed in at least one dimension (such as depth) as compared to the object 104.

Figure 2:
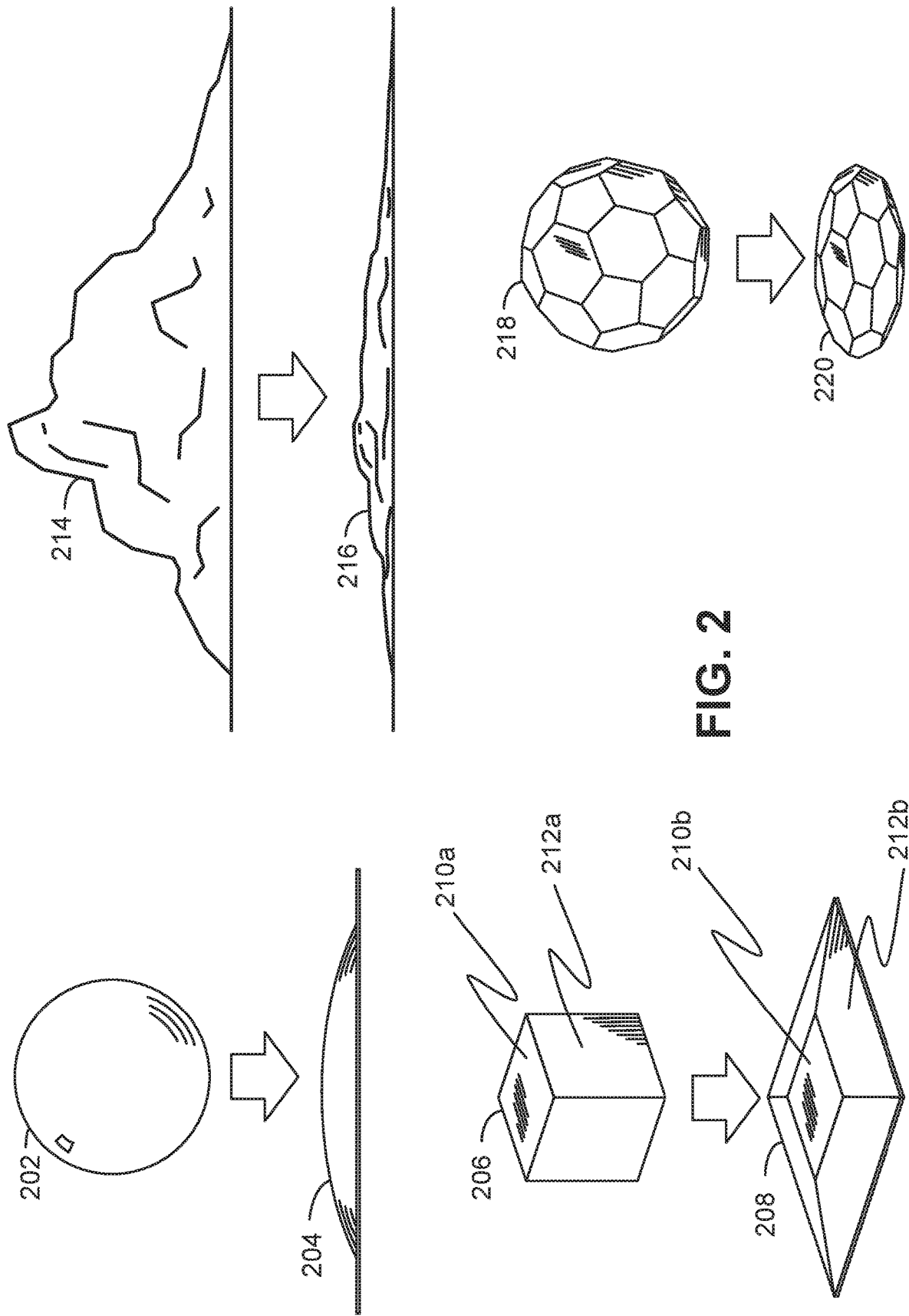
FIG. 2 is a schematic illustration of the generation of proxy surfaces in accordance with some embodiments.

FIG. 2 illustrates examples of 3D objects and corresponding proxy surfaces. As examples, a generally spherical 3D object 202 may be represented by a proxy surface 204 that has a generally arc-shaped cross section. A generally cubic 3D object 206 may be represented by a proxy surface 208 with a truncated pyramid shape. Specifically, a top surface 210*a* of the cubic object 206 may be represented in the proxy surface 208 by a central surface 210*b*, and a side surface 212*a* of the cubic object may be represented by lateral surface 212*b* of the proxy surface.

A 3D object 214, which may be a model of a geological feature such as a mountain, may be represented by a proxy surface 216 in which the vertical dimension (or depth) is compressed relative to the 3D object. Similarly, a 3D object 218, which has the shape of a truncated icosahedron (or is generally soccer-ball shaped), may be represented by a proxy surface 220 that is a depth-compressed version of the same shape.

Using the techniques described herein, the augmented-reality system generates and stores a compressed 3D model based on the obtained 3D model of the object. In some embodiments, generating the compressed 3D model includes generating a non-linear compression of the depth component of the obtained 3D model. The system may generate the compressed 3D model so as to maximize preservation of features relevant for tactile feedback, and possibly to prioritize preservation of these features over preservation of visual features.

If the object is a virtual object (e.g., an object rendered using a computer-based 3D drawing application), then the system may obtain the 3D model by, for example, electronically obtaining a digital representation of the virtual object. If the object is a physical object, then the system may obtain the model using an RGB-D sensor, optical 3D reconstruction techniques based on multiple 2D images, and/or other techniques known to those of skill in the art.

Figure 3A:
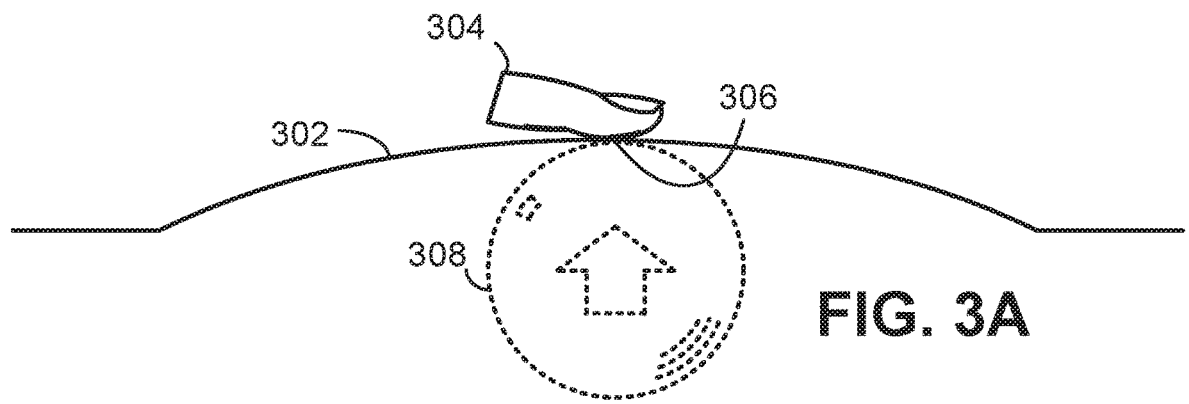
FIGS. 3A-3B are schematic views illustrating steps in the use of a haptic feedback method in accordance with some embodiments, in which a virtual object has a generally spherical form and the corresponding proxy surface has a generally arcuate cross section.
Figure 3B:
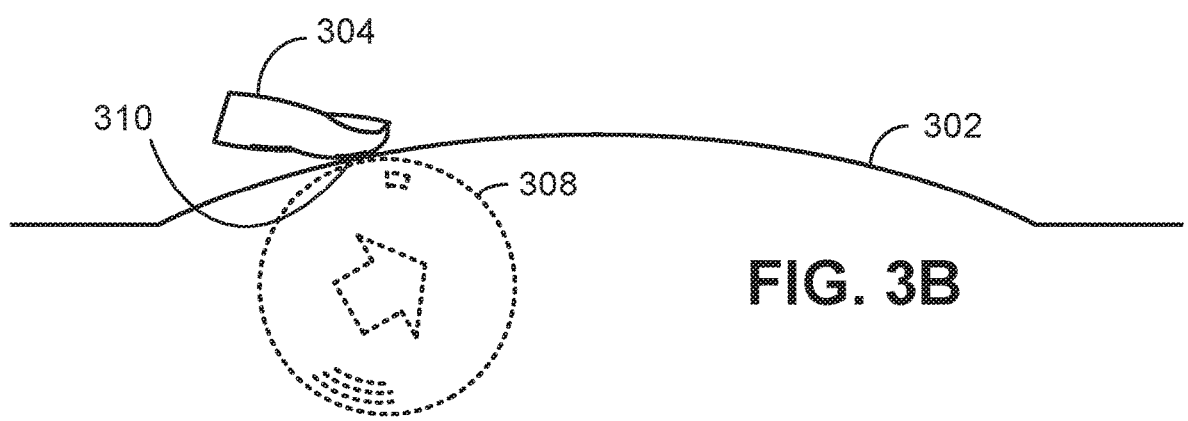

FIGS. 3A-3B illustrate the use of exemplary embodiments to provide haptic feedback during rendering of a generally spherical virtual object 308. A user touches a proxy surface 302 (depicted in cross-section) with his finger 304. The point at which the user's finger contacts the proxy surface 302 is touch point 306. The touch point 306 of the proxy surface 302 maps to a corresponding point on the surface of the virtual object 308. The virtual object 308 is rendered (e.g. on the user's augmented reality headset) such that the corresponding point on the surface of the virtual object 308 appears in alignment with the touch point 306.

As illustrated in FIG. 3B, the position (and in this embodiment, the orientation) of the virtual object 308 is changed in response to the user touching the proxy surface 302 at a second touch point 310. The second touch point 310 on the proxy surface 302 maps to a second corresponding point on the surface of the virtual object 308. The virtual object 308 is rendered such that the second corresponding point on the surface of the virtual object 308 appears in alignment with the second touch point 310. In some embodiments, as illustrated in FIGS. 3A and 3B, the virtual object may be rotated such that the surface of the virtual object is substantially tangent to the proxy surface at the current touch point (e.g. by orienting normal vectors to be substantially parallel to one another).

In an exemplary use case, the virtual object 308 is a globe representing, e.g., the earth, and the proxy surface 302 is smooth in areas that map to relatively smooth geological regions (e.g. the oceans) and the proxy surface 302 is rough in areas that map to relatively rugged geological regions (e.g. mountain ranges).

Figure 4A:
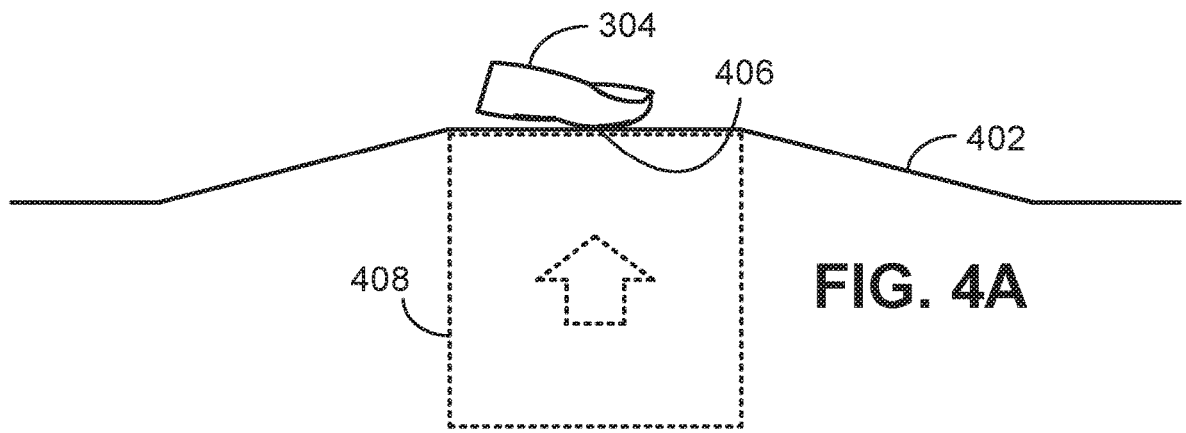
FIGS. 4A-4C are schematic views illustrating steps in the use of a haptic feedback method in accordance with some embodiments, in which a virtual object has a generally cube-shaped form, and the corresponding proxy surface has a generally pyramidal shape.
Figure 4B:
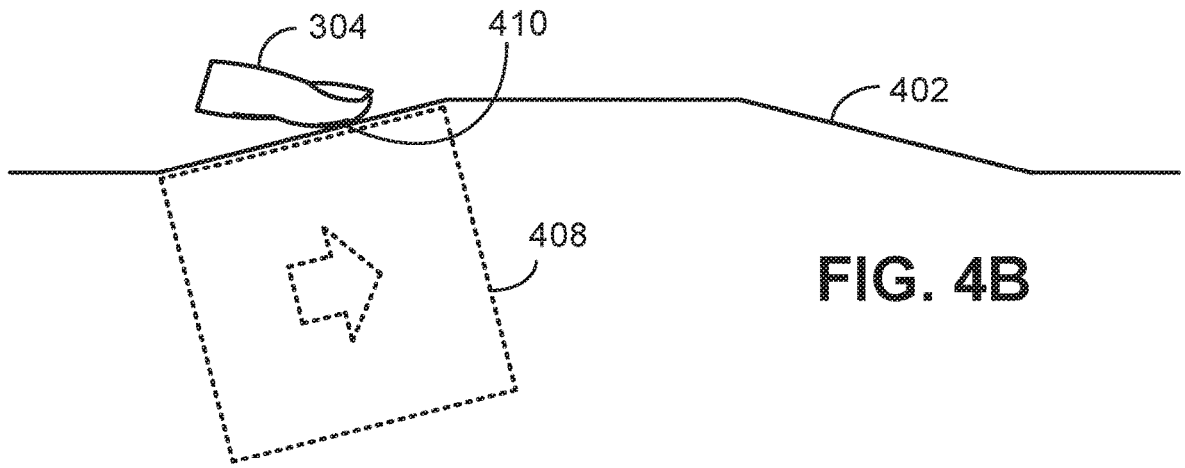
Figure 4C:
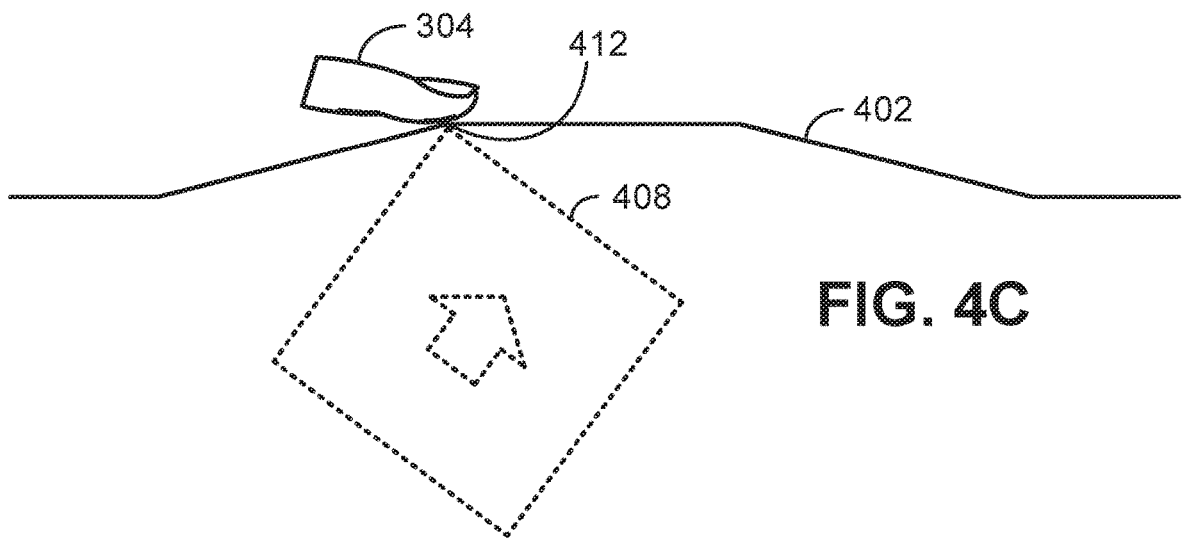

FIGS. 4A-4C illustrate the use of exemplary embodiments to provide haptic feedback during rendering of a generally cubic virtual object 408. In the illustration of FIG. 4A, a user touches a proxy surface 402 (depicted in cross-section) with his finger 304. The point at which the user's finger contacts the proxy surface 402 is touch point 406. The touch point 406 of the proxy surface 402 maps to a corresponding point on the surface of the virtual object 408. The virtual object 408 is rendered (e.g. on the user's augmented reality headset) such that the corresponding point on the surface of the virtual object 408 appears in alignment with the touch point 406.

In the illustration of FIG. 4B, the user touches the proxy surface 402 with his finger 304 at a new touch point 410. The touch point 410 of the proxy surface 402 maps to a corresponding point on the surface of the virtual object 408. The virtual object 408 is rendered such that the corresponding point on the surface of the virtual object 408 appears in alignment with the touch point 406. In some embodiments, as illustrated in FIGS. 4A and 4B, the virtual object may be rotated such that the surface of the virtual object is substantially tangent to the proxy surface at the current touch point.

In the illustration of FIG. 4C, the user touches the proxy surface 402 with his finger 304 at a new touch point 412 on an edge between two faces of the proxy surface. The touch point 412 of the proxy surface 402 maps to a corresponding point on the surface of the virtual object 408, in this case along an edge of the virtual object. The virtual object 408 is rendered such that the corresponding point on the surface of the virtual object 408 appears in alignment with the touch point 406. A user viewing virtual object 408 may thus be given the sensation of touching an edge of the virtual object 408 when in fact he is touching an edge of the proxy surface 402.

Figure 5A:
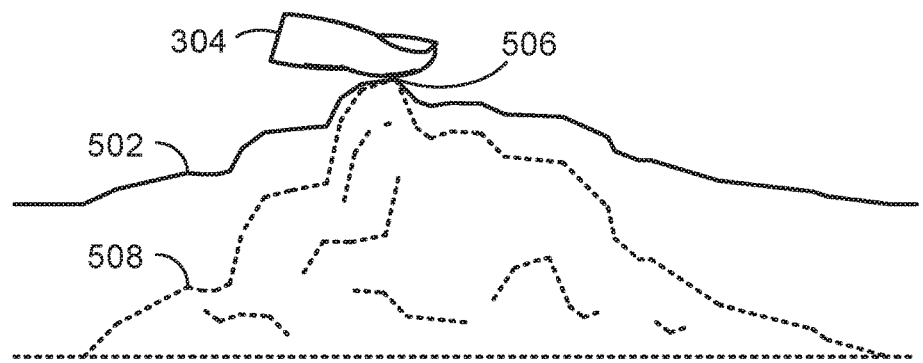
FIGS. 5A-5B are schematic views illustrating steps in the use of a haptic feedback method in accordance with some embodiments, in which a virtual object is a geological feature such as a mountain, and the corresponding proxy surface is a depth-compressed reproduction of the virtual geometric feature.
Figure 5B:
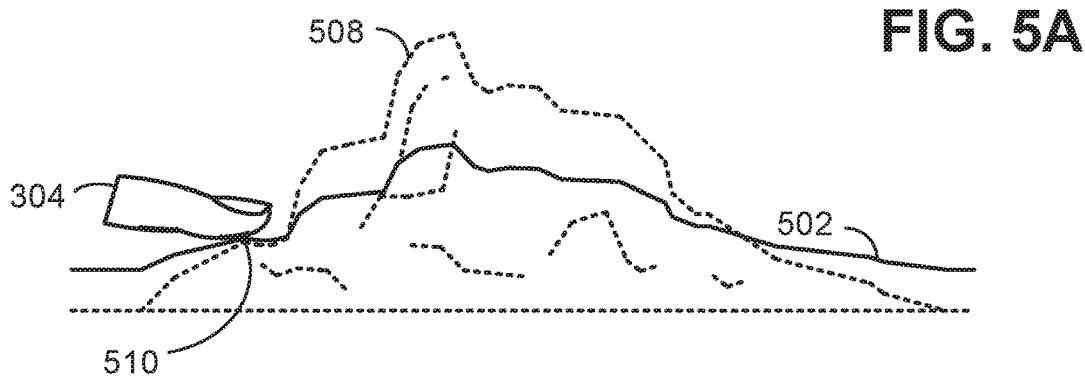

FIGS. 5A-5B illustrate the use of exemplary embodiments to provide haptic feedback in a case in which the virtual object 508 is a model of a geological feature such as a mountain, and the corresponding proxy surface 502 (illustrated in cross-section) is a depth-compressed reproduction of the virtual geometric feature. In the embodiments of 5A-5B, the proxy surface has the same scale along the horizontal dimensions (X,Y dimensions) but is compressed in scale in vertical dimension (Z dimension) relative to the virtual object 508.

In the illustration of FIG. 5A, the user touches the proxy surface 502 with his finger 304 at touch point 506. The touch point 506 of the proxy surface 502 maps to a corresponding point on the surface of the virtual object 508. The virtual object 508 is rendered such that the corresponding point on the surface of the virtual object 508 appears in alignment with the touch point 506. In the illustration of FIG. 5B, the user touches the proxy surface 502 with his finger 304 at a new touch point 510. The new touch point 510 of the proxy surface 502 maps to a corresponding point on the surface of the virtual object 508. The virtual object 508 is shifted upward such that the corresponding point on the surface of the virtual object 508 appears in alignment with the touch point 510. In some embodiments, as illustrated in FIGS. 5A and 5B, the virtual object is not rotated to accommodate different touch points. Instead, the vertical position of the virtual object (in the Z dimension) is shifted such that the virtual object aligns with the proxy surface. In some embodiments, the shift to align the virtual object with the touch point is performed along a different direction (e.g. in a horizontal direction).

Figure 6A:
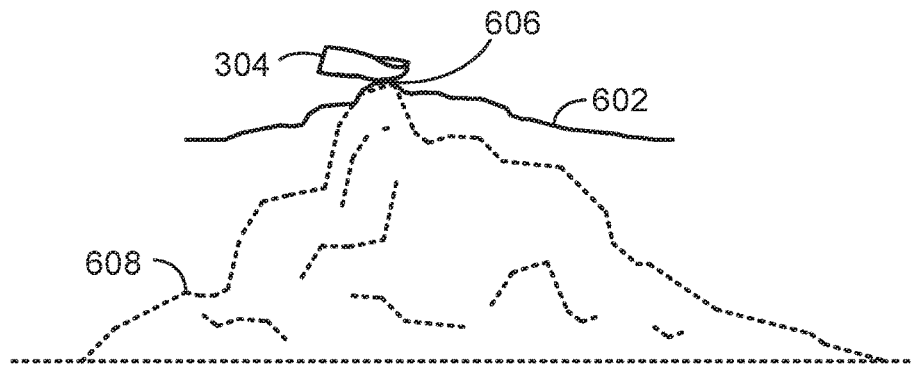
FIGS. 6A-6B are schematic views illustrating steps in the use of a haptic feedback method in accordance with some embodiments, in which a virtual object is a geological feature such as a mountain, and the corresponding proxy surface is a depth-compressed and length-compressed reproduction of the virtual geometric feature.
Figure 6B:
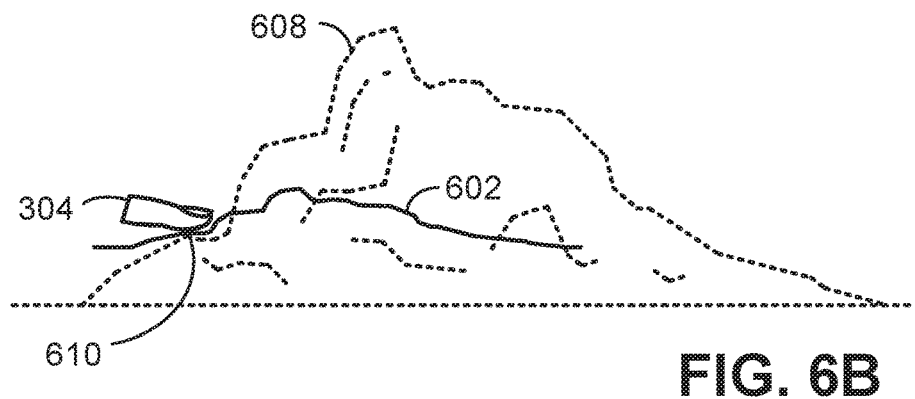

FIGS. 6A-6B illustrate the use of exemplary embodiments to provide haptic feedback in a case in which the proxy surface 602 that represents a virtual object 608 is compressed along more than one dimension relative to the virtual object.

Specifically, in the illustration of FIG. 6A, the user touches the proxy surface 602 with his finger 304 at touch point 606. The touch point 606 of the proxy surface 602 maps to a corresponding point on the surface of the virtual object 608. The virtual object 608 is rendered such that the corresponding point on the surface of the virtual object 608 appears in alignment with the touch point 606. In the illustration of FIG. 6B, the user touches the proxy surface 602 with his finger 304 at a new touch point 610. To align the virtual object 608 with the new touch point 610, the virtual object 608 is moved not only upward but also to the right (as compared to the position of virtual object 608 in FIG. 6A). The user is thus given the impression that he is touching an object (608) that is much larger than the proxy surface 602 that he is actually touching. This allows for the storage of relatively small objects (or the use of a relatively small configurable surface) to provide the experience of touching a relatively large object.

Figure 7:
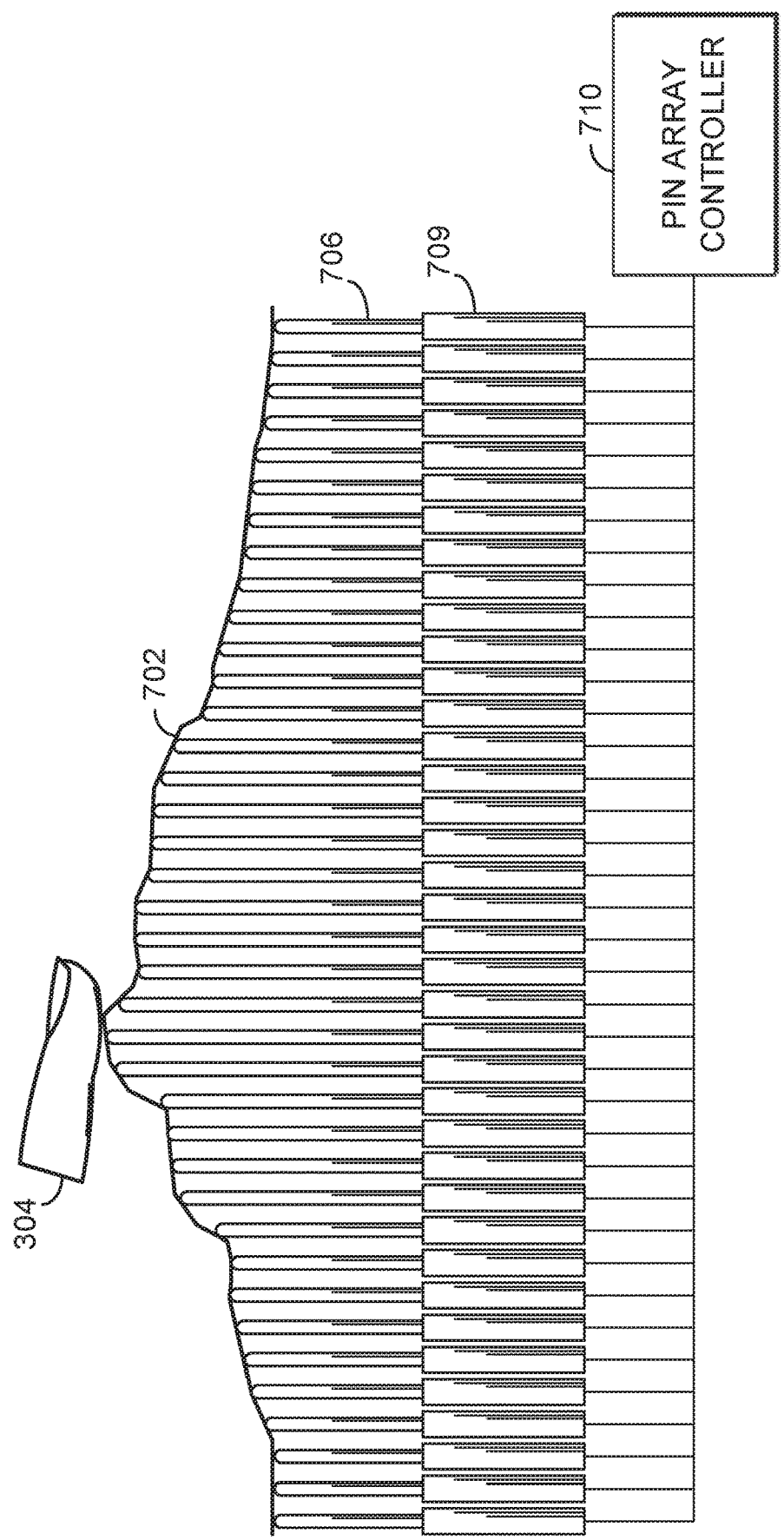
FIG. 7 is a schematic side view of an embodiment in which the proxy surface is a reconfigurable surface generated using a pin array.
Figure 8:
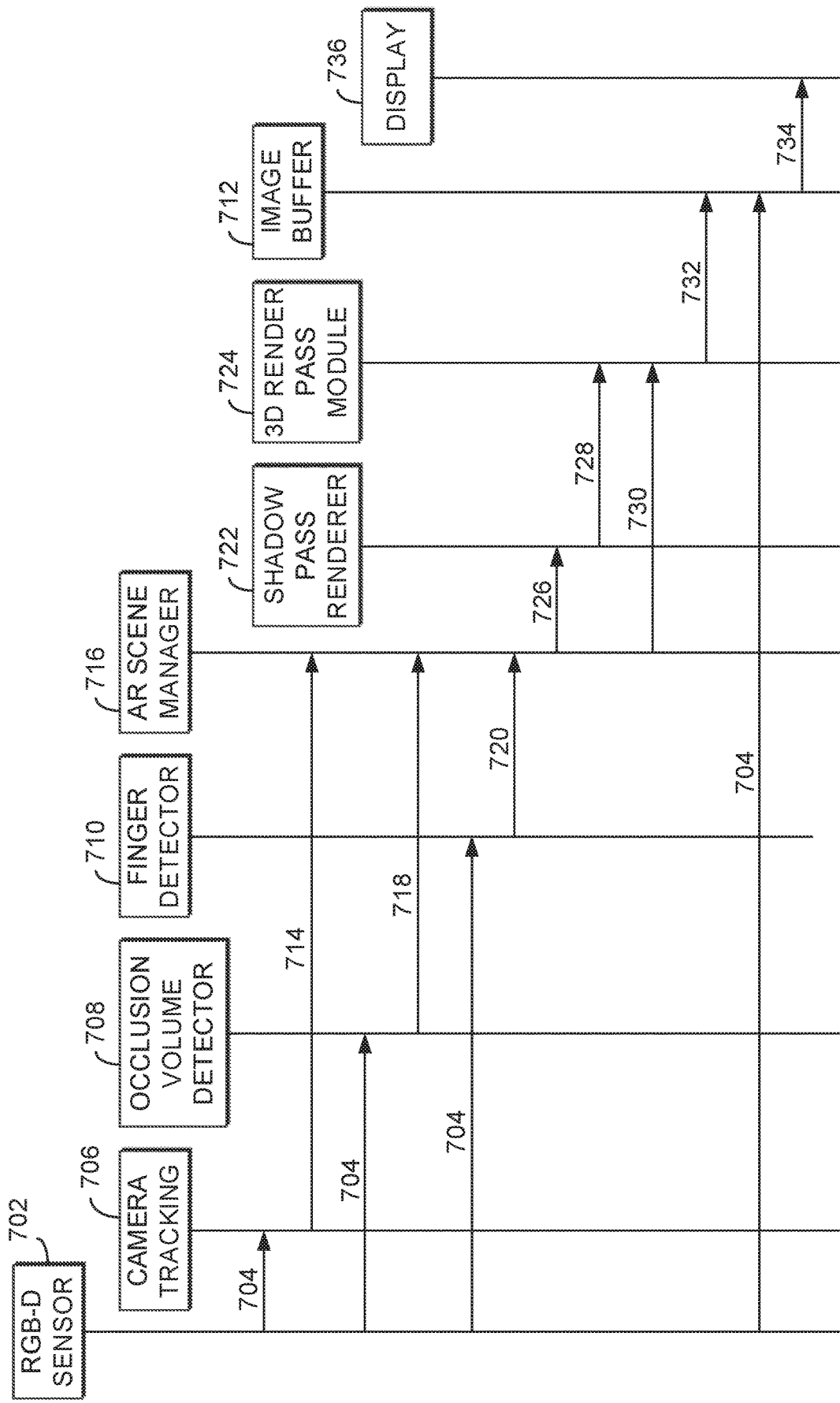
FIG. 8 is a message flow diagram illustrating steps performed in an exemplary embodiment.

An exemplary configurable surface 702 is illustrated in FIG. 7. In the example of FIG. 7, the configurable surface 702 is a pin array. In the pin array, a plurality of pins 706 are positioned by respective actuators 709 to provide a desired form to the configurable surface 702. The actuators 709 may be driven by a pin array controller 710 to conform to a desired shape. Although only one row of pins and actuators is illustrated in FIG. 7, it should be understood that the pin array may be a two-dimensional pin array with a plurality of rows. In some embodiments, the configurable surface 702 may be touch sensitive, and the pin array controller 710 may determine the location of a touch point on the surface.

In various embodiments, the virtual objects can be viewed using a virtual reality or augmented-reality device such as a smartphone or other mobile device, an optical and/or video see-through head-mounted display, a tablet computer, a personal computer, and/or any other device capable of displaying such 3D renderings. While augmenting the virtual object in alignment with the proxy surface, the proxy surface provides haptic feedback approximating physical shape of the original object.

Example Operation.

FIG. 7 is a sequence diagram of an example operation of an augmented-reality system, in accordance with at least one embodiment. The illustrated sequence may be performed one or more times while the augmented-reality system is in use (e.g., by a user).

As shown in FIG. 7, an RGB-D sensor 702 captures RGB-D data from the proxy surface and the area surrounding the proxy surface, and provides the data 704 to a camera tracking module 706, an occlusion volume detector 708, a finger-location detector 710, and an image buffer 712 (which may be part of a rendering module, e.g. for use with video see-through augmented reality).

The camera-tracking module 706 provides camera position and orientation information 714 (relative to the proxy surface) to an augmented-reality scene manager 716. Camera tracking can be implemented using a marker-based approach and/or a markerless-based approach, among other augmented-reality tracking methods known to those of skill in the art.

The occlusion volume detector 708 analyses depth information received from the RGB-D sensor 702 and generates 3D volumes that approximate the volume of any objects that may overlap or be in front of (or behind) the virtual element augmented on top of the relief. These generated 3D volumes 716 are then provided to the augmented-reality scene manager 716.

The finger-location detector 710 analyses data 704 received from the RBG-D sensor in order to detect the locations of a user's finger on the relief. The detected finger location 720 is then provided to the augmented-reality scene manager 716.

The augmented-reality scene manager 716 combines information received from the camera-tracking module 706, the occlusion-volume detector 708, and the finger-location detector 710 together with a description of the virtual 3D object.

Initially, the augmented-reality scene manager translates both the detected finger location and a description of the proxy surface into common coordinates based on data (e.g., camera pose information 714) received from the camera-tracking module 706. A point at which the user is touching the proxy surface can then be identified. In alternative embodiments, location of a finger touch on the proxy surface may be determined using other techniques, such as with the use of a touch-sensitive proxy surface.

The augmented-reality scene manager 716 translates the virtual object so that it corresponds with the touch point at which the user is touching the proxy surface. If the user is touching a single point on the proxy surface, the augmented-reality scene manager may translate the virtual object along an axis perpendicular to the relief surface so that the corresponding point on the proxy surface matches the point on the virtual object. In some embodiments, the system is operable to detect multiple touch points. In such embodiments, if the user is touching multiple points on the relief, the scene manager may determine a location and orientation for the virtual object that corresponds optimally with all the touch points on the relief. This optimization can be performed using iterative solvers, among other examples.

After the orientation and location of the virtual object is defined to match the touch point, the augmented-reality scene manager 716 adds occlusion volumes to the same coordinate system as the virtual object by translating the occlusion volumes with the pose provided by the camera-tracking module 706. Having combined the virtual object and occlusion volumes based on the detected touch points and camera pose, the augmented-reality scene manager 716 then renders the scene. The final image is rendered to an image buffer 712, which is then output to a display device.

In some embodiments, the augmented-reality scene manager performs a multi-pass rendering. In a first pass, a shadow pass renderer 722 receives information 726 regarding virtual objects, masking volumes, and virtual light source locations, and shadow pass renderer 722 renders shadows of one or more virtual light sources that are cast by the virtual object and occlusion volumes. Information 728 regarding shadows cast by virtual objects and masking volumes is provided to a 3D render pass module 724. Information 730 regarding AR objects, masking volumes, light sources, and camera pose may further be provided to the 3D render pass module 724 by the AR scene manager 716. The 3D render pass module 724 renders out visible parts of the virtual object, e.g., by masking parts of the virtual object according to the occlusion volumes (in order to correctly handle occlusions in the scene). Shadows cast by the virtual light sources are also taken into an account and rendered out. An image 732 generated by the 3D render pass module is provided to the image buffer 712. The image buffer 712 provides images 734 to the augmented reality display 736.

In the case of video see-through augmented reality, the augmented-reality scene manager 716 combines the 3D rendering with an RGB camera image received from the RGB-D sensor. Such combining is unnecessary for optical see-through augmented reality, but the augmented-reality scene manager may perform image enhancement—e.g., to minimize color bleed caused by transparency of the optical see-through augmented-reality display.

In at least one embodiment, the user's hand is segmented from the RGB-D sensor image and is rendered on top of the augmented 3D object in a manner that handles occlusions and shadow generation in a consistent manner. In at least one other embodiment, the augmented-reality scene manager deforms the captured image of the user's hand before rendering the final image—e.g., when providing the rendering to a video see-through augmented-reality display. In such an embodiment, virtual elements may be augmented on fixed location and changing of location and scale between relief and virtual object. Transformation (to align touch points correctly from the relief surface to the rendering of virtual object) may be applied to the augmented hand, while the true location of the user's hand may be hidden from the user. Such an approach may allow for augmentation in different scales and for augmentation of a hand touching physical objects on locations different from the relief. For example, the relief could be added to the glass of a shop window and the hand would be shown touching a real product behind the glass. Those of skill in the art will appreciate that the augmented-reality scene manager may implement any combination of these or other approaches for rendering a user's hand.

A tactile display may be used in addition to (or instead of) a 3D-printed relief. Such a tactile display may take the form of a deformable screen that generates a relief by creating a displacement on the surface of the screen. Further, the tactile display may provide additional haptic feedback (such as audio and/or ultrasonic feedback).

The features of the relief may be of varying magnitudes. For example, the relief may include very small surface/texture/3D details so that a user touching the relief can sense that his or her finger really is touching the material corresponding to the represented object. For example, a very smooth and hard surface may feel like real glass; other materials such as plastic, textile, fabric, and sandblasted textures can also be sensed. Multiple relief-production technologies and/or relief-surface materials may be used in combination. For example, both soft and hard surfaces with texture—e.g. skin of the face and eyeglasses—may be present in the same relief to simulate a realistic feel even though the relief is flat.

In an embodiment, an additional geometry transformation is performed before depth compression to maximize the surface area of the virtual object to be presented on a relatively flat relief. For example, spherical mapping, cylindrical mapping, geometry unfolding, geometric unwrapping, compression along at least one dimension, and other techniques can be used to distort the geometry in a way that allows for greater surface area of the object to be projected onto a plane than may otherwise be possible with just perspective or orthographic projection.

Traditional application areas of spherical projection techniques include the creation of maps, in which inherently spherical data of the earth is presented as 2D images. Computer graphics rely largely on these alternative projections and mapping techniques to produce texture and environment mappings. For manufacturing processes, cover elements designed with 3D design software is ultimately cut from flat metal sheets and, therefore, an optimal unfolding technique is determined.

In the case of haptics, very smooth and gradual shape changes can be neglected since they are generally not easily perceived. At the expense of large gradual curvatures, extended areas of the object may be included in the relief.

Additional geometry transformations may be taken into account when augmenting a 3D model. For example, a 3D virtual object may be rotated so that the tactile sensation aligns correctly with the augmented object. Virtual object transformations can be determined by rotating the object according to the average normal direction calculated from the touch point and/or by using a separate mapping lookup that is stored when the geometry deformation is performed.

Figure 9:
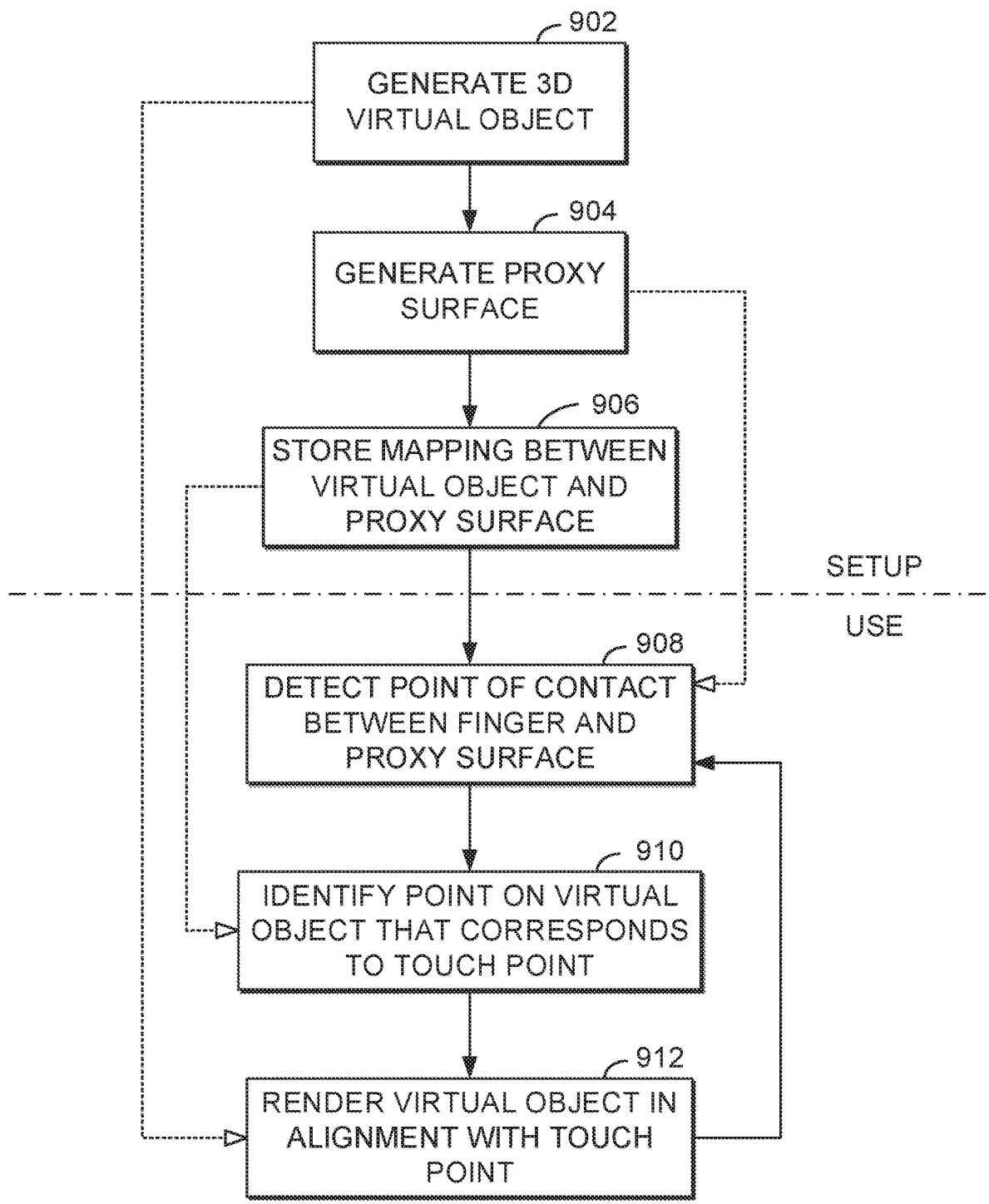
FIG. 9 is a flow chart illustrating an exemplary method of providing haptic feedback.

FIG. 9 is a flow diagram of a method that is performed in some embodiments. In a setup phase, a 3D model of a virtual object is generated in step 902. The 3D model may be generated using, e.g. computer-aided design software. In some embodiments, a 3D model is generated using a 3D scan of a physical 3D object. Other techniques for generating a 3D virtual object may alternatively be used. In step 904, a proxy surface is generated to correspond to the virtual object, the proxy surface may be, for example, a depth-compressed or unwrapped version of the virtual object. The proxy surface may be generated by 3D printing or through other manufacturing or prototyping techniques. In step 906, a mapping is stored between the virtual object and the proxy surface. The mapping may be provided in the form of, for example, a function or a lookup table that takes, as input, coordinates of a point on the proxy surface and provides, as output, coordinates of a point on the virtual object. The mapping may be a homeomorphic mapping. In some embodiments, information regarding the orientation of a tangent plane or a normal vector to the surfaces of the proxy surface and the virtual object is also stored.

In a use phase, in step 908, a point of contact (touch point) is detected between a user's finger and the proxy surface. The detection may be made through the use of, for example, a forward-facing camera on a user's augmented reality device, or through the use of a touch-sensitive component on or near the proxy surface, or by other techniques. One or more AR markers may be printed or otherwise displayed on the proxy surface to aid in determining the orientation and location of the surface. In some embodiments, an AR marker, QR code, or the like may be used to identify the proxy surface, and information regarding the virtual model and the mapping may be retrieved (e.g. over the Internet) based on the identification.

In step 910, the touch point on the proxy surface is mapped to a corresponding point on the virtual model. In step 912, the virtual object is rendered in alignment with the touch point by rendering the virtual object at a position such that the point on the virtual model that corresponds to the touch point is positioned substantially at the touch point. In some embodiments, alignment of the virtual object with the touch point further includes selecting an orientation of the virtual object such that the surface of the virtual object and the surface of the proxy surface are substantially tangent to one another.

Exemplary Applications.

Various embodiments described herein have multiple practical applications. For example:

Training and Learning Applications—Schools, colleges, and universities generally do not have storage space for a large amount of 3D objects. Using the embodiments described herein, each student could have his or her own copy of each 3D object (instead of each classroom having only one item for the whole class).

3D-Books and Pictures, Children's Books—Printed magazines and books with 3D-relief images utilizing the described embodiments may increase the user experience significantly. Potential application areas include education, e.g. schoolbooks, and printed media for children, among others.

Games—New types of 3D board and table games can be constructed based on haptic user interfaces utilizing the embodiments described herein. Players can interact with physical game pieces (or other items on the relief board) with a visual/haptic experience based on augmented reality.

User Interfaces, Haptic Control Panels—The described embodiments may be employed to create a haptic sensation that is useful for fast and reliable manipulation of different controls—e.g. sliders, buttons, switches etc.—in control rooms and in vehicles, as examples. If a given surface is not smooth (but instead feels like, e.g., a miniature washboard), then the user could feel that his or her finger is moving an augmented slider (or other interface/control) with some haptic resistance.

Visualization of Design—Using the described embodiments, designers can produce flat, easy to manage (or mail or store) relief versions of final three-dimensional objects. Haptic and visual sensation can be enhanced using the described embodiments so that other people can easily understand the shapes and outlook of the final product.

Art Works—The described embodiments provide new possibilities for artists to create new types of art works. In addition, in homes, art galleries, and museums, relief copies of 3D items can be displayed so that the users can touch and see the embodiment of the original item.

Advertising—Utilizing the described embodiments, clients can touch and see the real products on a relief surface that is easy to hang on a wall or send in an envelope.

Packaging—Product packages can have 3D relief images on one or more sides based on the described embodiments so that the users can touch, feel, and see the real products before opening the package. For example, each side of the product package can have a 3D relief image from corresponding direction of the real product.

Those of skill in the art will appreciate that numerous other applications for the described embodiments are possible as well.

Wireless Transmit/Receive Unit

Methods described herein may be performed by modules that carry out (i.e., perform, execute, and the like) various functions that are described herein. As used in this disclosure, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Figure 10:
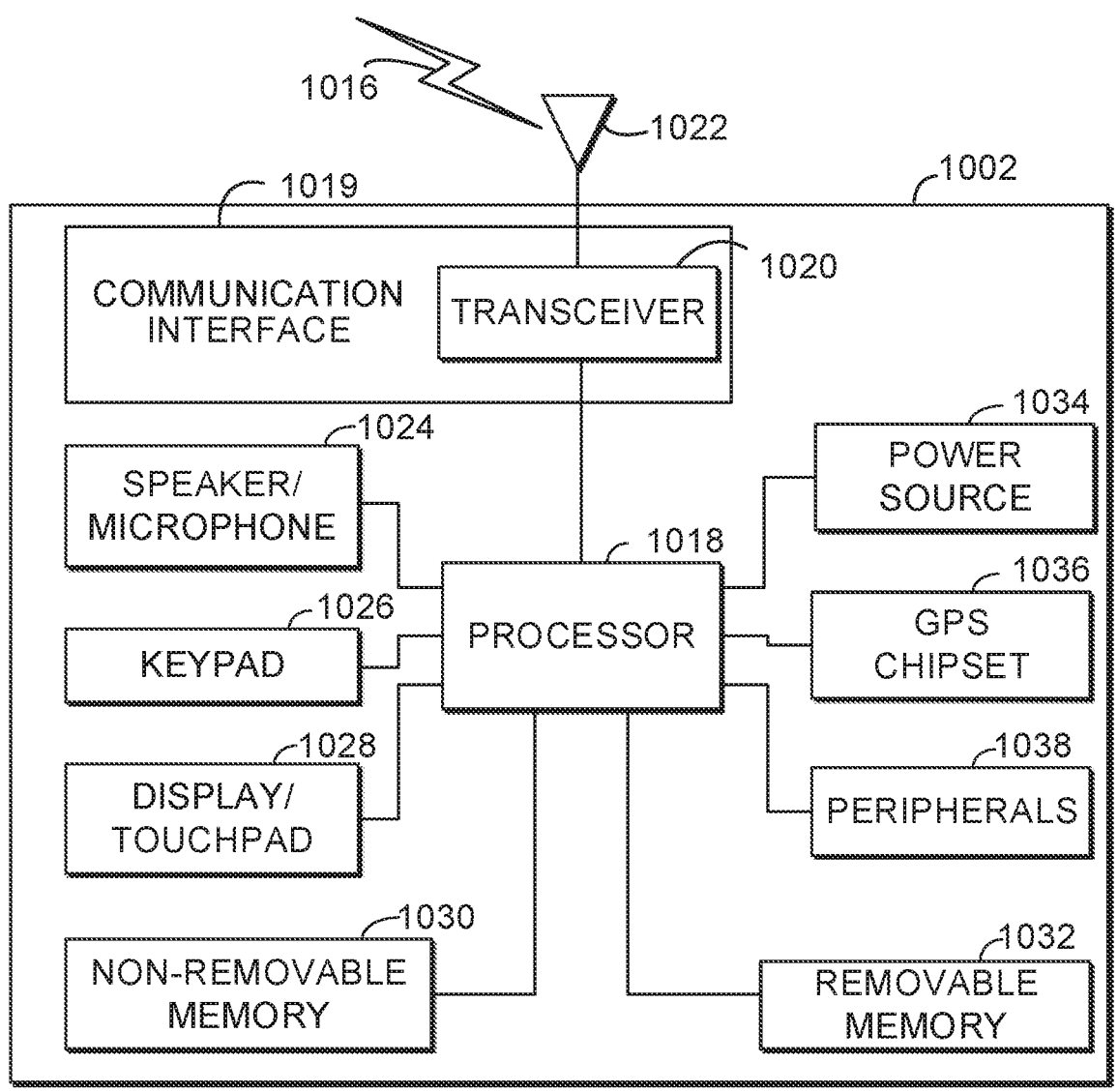
FIG. 10 is a functional block diagram of a wireless transmit/receive unit (WTRU) that may be employed as an augmented reality or virtual reality display device in some embodiments.

In some embodiments, the systems and methods described herein may be implemented in a wireless transmit receive unit (WTRU), such as WTRU 1002 illustrated in FIG. 10. In some embodiments, the components of WTRU 1002 may be implemented in an augmented-reality system, a computing device, a mobile device, an optical and/or video see-through head-mounted display, a personal computer, and/or any combination of these, as examples. As shown in FIG. 10, the WTRU 1002 may include a processor 1018, a transceiver 1020, a transmit/receive element 1022, audio transducers 1024 (preferably including at least two microphones and at least two speakers, which may be earphones), a keypad 1026, a display/touchpad 1028, a non-removable memory 1030, a removable memory 1032, a power source 1034, a global positioning system (GPS) chipset 1036, and other peripherals 1038 (such as an RGB-D sensor). It will be appreciated that the WTRU 1002 may include any sub-combination of the foregoing elements while remaining consistent with an embodiment. The WTRU may communication to nodes such as, but not limited to, base transceiver station (BTS), a Node-B, a site controller, an access point (AP), a home node-B, an evolved home node-B (eNodeB), a home evolved node-B (HeNB), a home evolved node-B gateway, and proxy nodes, among others.

The processor 1018 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 1018 may perform signal coding, data processing, power control, input/output processing, and/or any other functionality that enables the WTRU 1002 to operate in a wireless environment. The processor 1018 may be coupled to the transceiver 1020, which may be coupled to the transmit/receive element 1022. While FIG. 10 depicts the processor 1018 and the transceiver 1020 as separate components, it will be appreciated that the processor 1018 and the transceiver 1020 may be integrated together in an electronic package or chip.

The transmit/receive element 1022 may be configured to transmit signals to, or receive signals from, a node over the air interface 1015. For example, in one embodiment, the transmit/receive element 1022 may be an antenna configured to transmit and/or receive RF signals. In another embodiment, the transmit/receive element 1022 may be an emitter/detector configured to transmit and/or receive IR, UV, or visible light signals, as examples. In yet another embodiment, the transmit/receive element 1022 may be configured to transmit and receive both RF and light signals. It will be appreciated that the transmit/receive element 1022 may be configured to transmit and/or receive any combination of wireless signals.

In addition, although the transmit/receive element 1022 is depicted in FIG. 10 as a single element, the WTRU 1002 may include any number of transmit/receive elements 1022. More specifically, the WTRU 1002 may employ MIMO technology. Thus, in one embodiment, the WTRU 1002 may include two or more transmit/receive elements 1022 (e.g., multiple antennas) for transmitting and receiving wireless signals over the air interface 1015.

The transceiver 1020 may be configured to modulate the signals that are to be transmitted by the transmit/receive element 1022 and to demodulate the signals that are received by the transmit/receive element 1022. As noted above, the WTRU 1002 may have multi-mode capabilities. Thus, the transceiver 1020 may include multiple transceivers for enabling the WTRU 1002 to communicate via multiple RATs, such as UTRA and IEEE 802.11, as examples.

The processor 1018 of the WTRU 1002 may be coupled to, and may receive user input data from, the audio transducers 1024, the keypad 1026, and/or the display/touchpad 1028 (e.g., a liquid crystal display (LCD) display unit or organic light-emitting diode (OLED) display unit). The processor 1018 may also output user data to the speaker/microphone 1024, the keypad 1026, and/or the display/touchpad 1028. In addition, the processor 1018 may access information from, and store data in, any type of suitable memory, such as the non-removable memory 1030 and/or the removable memory 1032. The non-removable memory 1030 may include random-access memory (RAM), read-only memory (ROM), a hard disk, or any other type of memory storage device. The removable memory 1032 may include a subscriber identity module (SIM) card, a memory stick, a secure digital (SD) memory card, and the like. In other embodiments, the processor 1018 may access information from, and store data in, memory that is not physically located on the WTRU 1002, such as on a server or a home computer (not shown).

The processor 1018 may receive power from the power source 1034, and may be configured to distribute and/or control the power to the other components in the WTRU 1002. The power source 1034 may be any suitable device for powering the WTRU 1002. As examples, the power source 1034 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 1018 may also be coupled to the GPS chipset 1036, which may be configured to provide location information (e.g., longitude and latitude) regarding the current location of the WTRU 1002. In addition to, or in lieu of, the information from the GPS chipset 1036, the WTRU 1002 may receive location information over the air interface 1015 from a base station and/or determine its location based on the timing of the signals being received from two or more nearby base stations. It will be appreciated that the WTRU 1002 may acquire location information by way of any suitable location-determination method while remaining consistent with an embodiment.

The processor 1018 may further be coupled to other peripherals 1038, which may include one or more software and/or hardware modules that provide additional features, functionality and/or wired or wireless connectivity, including sensor functionality. For example, the peripherals 1038 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method for enabling haptic feedback for objects in an augmented reality system, the method comprising:
   detecting a position of a first touch point at which a user is touching a proxy surface, the proxy surface being associated with a physical or virtual three-dimensional (3D) object;
   mapping the first touch point to a first corresponding point on the 3D object by using a stored mapping of coordinates of points on the proxy surface and corresponding coordinates of points on the surface of the 3D object;
   determining a first position of an augmented hand such that the augmented hand is in alignment with the first corresponding point on the 3D object; and
   displaying the augmented hand at the first determined position on an augmented reality display.

2. The method of claim 1, further comprising:
   after displaying the augmented hand at the first determined position, detecting a position of a second touch point at which the user is subsequently touching the proxy surface;
   mapping the second touch point to a second corresponding point on the 3D object using the stored mapping;
   determining a second position of the augmented hand such that the augmented hand is in alignment with the second corresponding point on the surface of the 3D object; and
   displaying the augmented hand at the second determined position on the augmented reality display.

3. The method of claim 1, wherein the proxy surface is a depth-compressed model of the 3D object.

4. The method of claim 1, wherein the proxy surface is an unwrapped model of the 3D object.

5. The method claim 1, wherein the proxy surface is a relief surface.

6. The method of claim 1, wherein the proxy surface is a configurable surface.

7. The method of claim 1, wherein the augmented hand is a segmented image of the user's hand.

8. The method of claim 1, wherein the 3D object is a physical object.

9. The method of claim 1, wherein the augmented reality display is an augmented reality headset.

10. The method of claim 9, wherein the position of the first touch point is detected using a camera on the augmented reality headset.

11. The method of claim 1, wherein the proxy surface is touch sensitive, and wherein the position of the first touch point is detected using the touch-sensitive proxy surface.

12. An augmented reality system comprising:
   a finger detector operative to detect a position of a touch point at which a user is touching a proxy surface, the proxy surface being associated with a 3D object;
   an augmented reality scene manager operative (i) to map the touch point to a corresponding point on the 3D object by using a stored mapping of coordinates of points on the proxy surface and corresponding coordinates of points on the surface of the 3D object, and (ii) to determine a position of an augmented hand such that the augmented hand is in alignment with the corresponding point on the 3D object; and
   an augmented reality display operative to display the augmented hand at the determined position.

13. The augmented reality system of claim 12, wherein the augmented reality display is an augmented reality headset.

14. The augmented reality system of claim 12, wherein the proxy surface is touch sensitive, and wherein the finger detector comprises the proxy surface.

15. The augmented reality system of claim 12, wherein the proxy surface is a configurable surface.

16. The augmented reality system of claim 12, wherein the proxy surface is a depth-compressed model of the 3D object.

17. The augmented reality system of claim 12, wherein the proxy surface is an unwrapped model of the 3D object.

* * * * *